(No Model.)

H. H. HOOKER.
CULTIVATOR.

No. 390,783. Patented Oct. 9, 1888.

WITNESSES:
Fred J. Dieterich
Wm. Meister

INVENTOR,
H. H. Hooker
BY Munn & Co.
ATTORNEY,

UNITED STATES PATENT OFFICE.

HENRY H. HOOKER, OF WILMOT, KANSAS.

CULTIVATOR.

SPECIFICATION forming part of Letters Patent No. 390,783, dated October 9, 1888.

Application filed June 28, 1888. Serial No. 278,489. (No model.)

*To all whom it may concern:*

Be it known that I, HENRY H. HOOKER, of Wilmot, in the county of Cowley and State of Kansas, have invented a new and useful Improvement in Cultivators, of which the following is a specification.

This invention contemplates certain improvements in cultivators, and is more particularly designed for cultivating garden-vegetables, especially young onions and other tender plants, while it is equally applicable for field purposes—as, for instance, in cultivating corn at that stage of its growth or of such height that it is impracticable to permit of its further cultivation by the usual wheeled or riding cultivator. Among other immediate advantages of this invention may be mentioned its adaptation to effect the removal or riddance of more particularly "crab-grass" and "milk-weeds," which greatly damage the growth of the crops, as well as to cultivate strawberry-patches and to keep the paths between the same at the proper width.

To these ends the nature of the invention consists of the detailed construction and disposition of the parts, substantially as hereinafter fully set forth and claimed.

Figure 1:
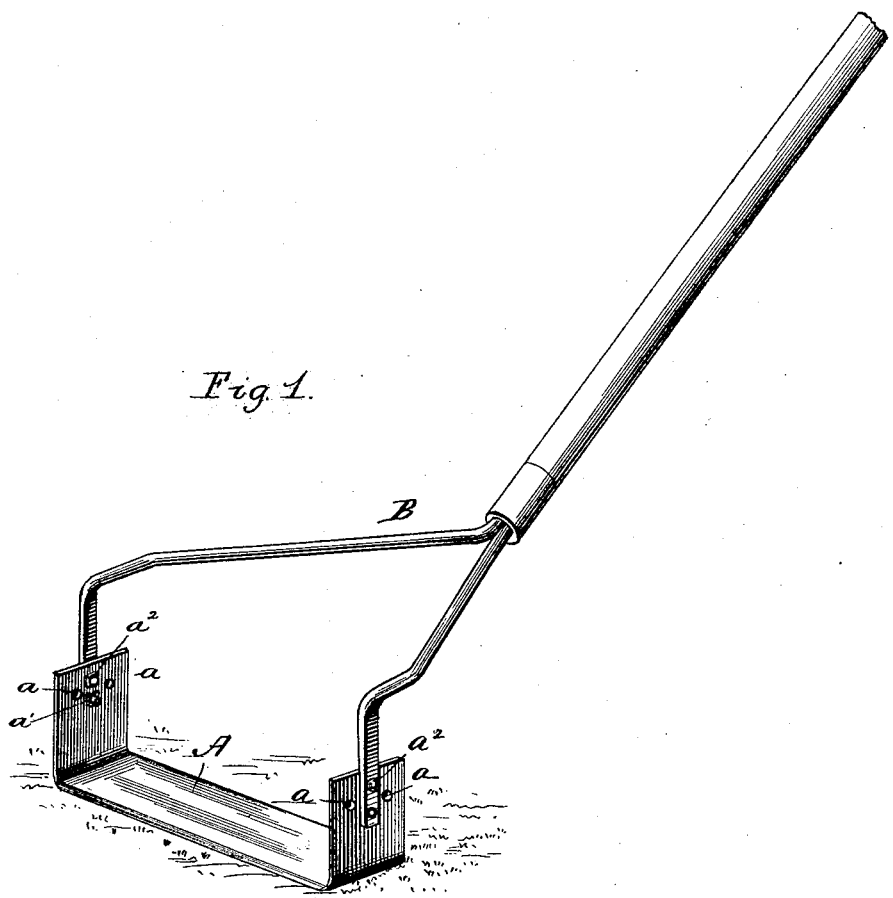
Figure 2:
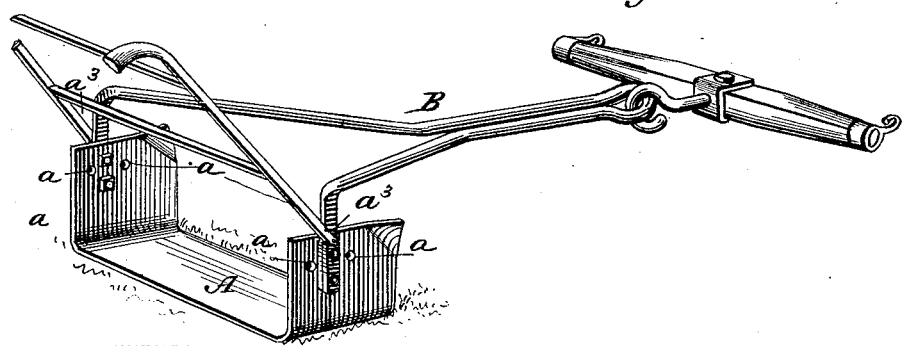

In the accompanying drawings, Figure 1 is a perspective view of my improved cultivator as adapted for hand use, and Fig. 2 is a similar view of the same as applied for the use therewith of a team.

In the embodiment of my invention I take a piece of metal, preferably of highly-tempered steel, which is of an approximately U shape, and grind a sharp cutting-edge upon each of the longitudinal edges of its horizontal or connecting portion and polish the same, thus forming a cutter or blade, A, having two cutting-edges. The vertical or side portions of the cutter or blade A are each provided with a series of adjusting-apertures, $a\ a$, arranged in the arc of a circle, and in alignment with the central one of which apertures is a pivot-receiving aperture, $a'$.

B is a bail constructed, preferably, of rod metal, having its divergent portions extended downward and flattened and pivoted to the vertical or side portions of the cutter or blade A, the pivots passing through the apertures $a'$ $a'$ of the said vertical or side portions.

In connection with the adjusting-apertures $a\ a$ of the vertical or side portions of the blade or cutter A and the bail B are used adjusting pins or bolts $a^2\ a^2$, one applied to each side, for effecting the adjustment of the cutter or blade at the required angle of presentation to the surface or ground to regulate the depth of penetration of the cutter or blade. By means of this arrangement of adjusting-apertures and pins or bolts and the pivoting of the cutter or blade it is also adapted to be reversed side for side, thus permitting of the bringing into use either cutting-edge of the blade or cutter, one cutter or blade thereby lasting as long as two of the ordinary form. The convergent portion of the bail B is extended into a narrow shank, $b$, to which in practice is applied a handle of suitable construction and length for the convenient handling of the implement in the process of cultivation.

In the modification is shown my invention as adapted for operation by horse-power, being provided at the extreme forward end of the shank of its bail to permit of the attachment thereto of a swivel-bolt and whiffletree. To the sides or vertical portions of the cutter or blade are applied short oblique plates $a^3\ a^3$, extending rearward, to which in practice are applied handles for the guidance by the attendant or driver of the cultivator.

Having thus fully described my invention, what I claim as new, and desire to secure by Letters Patent, is—

1. The cultivator consisting of the cutter or blade having vertical or upright side portions and the bail having its divergent portions provided with right-angled extensions having pivotal connection at their lower ends with the upright or vertical side portions of the cutter or blade, the convergent portions of said bail being formed into a narrow shank, substantially as shown and described, and for the purpose specified.

2. The combination, with the cutter or blade having its vertical side portions provided with a series of adjusting-apertures, of the bail having its divergent portions formed with right-angled extensions, the lower ends of which are pivoted to the side portions of the blade or cutter, and adjusting bolts or pins passed through said adjusting-apertures of the cutter side portions, substantially as set forth.

3. The cultivator consisting of the cutter or blade having its vertical or upright side portions provided with series of adjusting-apertures, the bail having its convergent portion provided with a narrow shank having at the forward end a loop or eye, while the divergent portions of said bail are provided with right-angled extensions having pivotal connection at their lower ends with the upright or vertical side portions of the cutter or blade, and the adjusting bolts or pins engaging with apertures in said bail-extensions and in the side portions of the cutter or blade, substantially as specified.

HENRY H. HOOKER.

Witnesses:
JNO. D. PRYOR,
H. E. SILLIMAN.